(12) United States Patent
Foiret et al.

(10) Patent No.: US 11,933,224 B2
(45) Date of Patent: Mar. 19, 2024

(54) FUEL METERING UNIT FOR AN AIRCRAFT ENGINE

(71) Applicant: SAFRAN AIRCRAFT ENGINES, Paris (FR)

(72) Inventors: Guilhem Alcide Auguste Foiret, Moissy-Cramayel (FR); Arnaud Bernard Clément Thomas Joudareff, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/293,345

(22) PCT Filed: Nov. 12, 2019

(86) PCT No.: PCT/FR2019/052691
§ 371 (c)(1),
(2) Date: May 12, 2021

(87) PCT Pub. No.: WO2020/099779
PCT Pub. Date: May 22, 2020

(65) Prior Publication Data
US 2022/0010729 A1    Jan. 13, 2022

(30) Foreign Application Priority Data
Nov. 13, 2018    (FR) ...................................... 1871506

(51) Int. Cl.
*F02C 7/232*    (2006.01)
*F02C 7/22*    (2006.01)

(52) U.S. Cl.
CPC .......... *F02C 7/22* (2013.01); *F05D 2220/323* (2013.01); *F05D 2240/35* (2013.01)

(58) Field of Classification Search
CPC ...... F02C 7/22; F02C 7/232; F05D 2220/323; F05D 2240/35
See application file for complete search history.

(56) References Cited

U.S. PATENT DOCUMENTS 4,998,949 A    3/1991    Cantwell
2004/0117102 A1*    6/2004    Weir ....................... F02C 9/263
701/1

(Continued)

FOREIGN PATENT DOCUMENTS

FR    2956380 A1    8/2011
FR    2960906 A1    12/2011
FR    2965698 A1    4/2012

OTHER PUBLICATIONS

French Search Report for French Application No. 1871506, dated Aug. 1, 2019.

(Continued)

*Primary Examiner* — Steven M Sutherland
(74) *Attorney, Agent, or Firm* — BIRCH, STEWART, KOLASCH & BIRCH, LLP

(57) ABSTRACT

The present invention relates to a fuel metering unit for an aircraft engine, comprising: —a metering member configured to receive a position control signal and to meter the feed of fuel to the engine depending on said position control; —a cutting member configured to cut the feed of fuel to the engine; and characterized in that the fuel metering unit also has a computer for protecting and cutting the engine, said protecting and cutting computer being configured to—detect an overspeeding state of the engine speed and—in response to the detection of an overspeeding state, to transmit a cutting control signal to a cutting control member contained in the cutting member.

7 Claims, 4 Drawing Sheets

(56) References Cited

U.S. PATENT DOCUMENTS

| | | | | |
|---|---|---|---|---|
| 2007/0113559 A1* | 5/2007 | Zagranski | ............... | F02C 9/46 |
| | | | | 60/773 |
| 2007/0234732 A1* | 10/2007 | Shelby | ................ | F02C 7/232 |
| | | | | 60/734 |
| 2011/0253231 A1* | 10/2011 | Dore | .................. | F02C 7/232 |
| | | | | 137/511 |
| 2012/0315152 A1* | 12/2012 | Baker | .................. | F02C 7/22 |
| | | | | 417/302 |
| 2013/0327044 A1* | 12/2013 | Portolese | ............ | F02C 7/232 |
| | | | | 60/734 |
| 2016/0047274 A1* | 2/2016 | Woolworth | .......... | F02C 9/18 |
| | | | | 415/146 |

OTHER PUBLICATIONS

International Search Report and Written Opinion of the Interarntional Searching Authority for International Application PCT/FR2019/052691, dated Mar. 10, 2020.

\* cited by examiner

FUEL METERING UNIT FOR AN AIRCRAFT ENGINE

FIELD OF THE INVENTION

The present invention relates to the general field of aeronautics.

It relates more particularly to the field of fuel feed control systems for an aircraft engine. This engine is, for example, a turbomachine such as a turbojet.

PRIOR ART

In known fashion, the control system of an aircraft engine comprises a main electronic computer which appears in the form of a housing enclosing one or a plurality of electronic boards assigned to provide various functions.

In current engines, the engine control system is generally responsible for controlling a fuel metering unit, corresponding to a hydromechanical block commonly called FMU ("fuel metering unit").

The hydromechanical block provided several functions in common. It provides, through a metering member, the metering of the fuel, i.e. the translation of the required fuel flow rate information within the total fuel flow rate fed by the pumping system, which results from a need prescribed by a control unit of the control system depending on the flight phase, with the required relative accuracy. It also allows, through a cutoff member, the cutting off of the fuel flow rate due to a pilot command, and the cutoff and/or control of the fuel flow rate in the emergency case of an overspeed (engine speed which exceeds a threshold beyond which centrifugal forces are critical and risk causing breakage of parts, which necessitates, for safety, a cutoff of the engine) detected by a speed sensor of the high—and/or low-pressure part of the engine.

For better operating accuracy of the systems, and especially for the flexibility of control/configuration of operability, but also for reasons of improved mass, volume, today the engine control computers integrated certain electronic functions previously satisfied by hydromechanical blocks, such as in particular the function of "overspeed protection" allowing protecting the engine in a case where the engine speed would exceed the predefined maximum speed threshold (overspeed), by monitoring the speed and cutting off of the engine if an overspeed is detected.

However, the behavior of an engine computer (control computer, also called FADEC for "Full Authority Digital Engine Control," and more generally called an EEC, for "Electronic Engine Controller") in the event of overheating or of fire is difficult to predict, which causes engine manufacturers to consider the worst case assumption for the certification of computers (by the certification authorities for aeronautical equipment). Thus, the certification constraints impose not undergoing a simple electrical or electronic which could cause a hazardous event. For example, an engine overspeed event cause by erroneous control of the metering member (called the "Fuel Metering Valve:" FMV) of the hydromechanical block (for example reaching the mechanical maximum metering stop, normally protected by a control stop).

Consequently, in the context of a degraded operating mode of the engine such as during a fire scenario, in which the overspeed event is a feared event, it is necessary to demonstrate that the function of overspeed protection provided by the overspeed detection and cutoff functions of the engine is still operational at the moment when the control function provided by the computer dies. This scenario is called a "clean death" of the control unit of the control system. In the contrary case, if a "non-clean death" is considered, the overspeed protection function therefore "dies" prematurely, leaving the control function sole master on board. The worst scenario would then be an erroneous command of the control system to a member controlling the engine, for example an erroneous position command to an actuator of a fuel metering unit leading to an overspeed condition of the engine in which the overspeed protection function could not accommodate the breakdown and consequently cut off the engine before it damages itself.

To counter such a possibility, various solutions are contemplated in the prior art.

One solution consists of using, for the overspeed protection function, electronic components resisting very high temperatures. This thus means ensuring that in the scenario contemplated above, a failure of an electronic board assigned the overspeed protection function would occur later than a failure of a board (of the engine computer) responsible for the control function. Historically, however, such components are components developed in small quantity, for very specific military aeronautical applications. For this reason, they are very costly and difficult to obtain, and subject to early obsolescence.

An alternative solution consists of installing the overspeed protection function in a localized computer located in a zone called "fire free," in other words in an environment different from that of the control computer.

In the case in particular of certain engines developed by the applicant, the overspeed management functions are integrated into the engine computer. This solution imposes resolving the certification problems of the computer, in particular regarding fire management events, particularly by solutions of segregating the two sub-systems containing the members accomplishing the control and protection functions within the same housing.

In another solution, as is the case in other engines developed by the applicant, an independent computer is developed for implementing the overspeed protection functions in a "fire free zone" and positioned separately from the control computer (engine computer), which for its part is positioned in a fire zone. However, the impacts in terms of mass (additional . . . housing, harness, supports) are considered to be great and are manifested in particular by an increase in the specific fuel consumption. Moreover, the development costs of an electronic aircraft computer are very high; an architecture comprising two computers developed independently is therefore particularly costly.

In another alternative solution, the Snecma publication FR2957667A1 discloses a device for detecting overheating affecting an engine computer such as a FADEC, having at least one temperature sensor located inside the computer, and at least one overheating detector located outside the computer in proximity to it.

This publication does not disclose a detection strategy allowing discriminating overheating not linked to an ignition start.

On the other hand, the solution of this publication does not allow ensuring a sufficient thermal margin, considering thermal inertia, to ensure a "clean death" of the control computer.

Consequently, considering the current state of the art, there exists no very satisfying solution for a fuel feed control system having an overspeed protection function for an aircraft engine, not penalizing mass and installation cost, and allowing satisfying the certification constraints for accommodating a degraded operation mode of the engine such as in response to a case of fire.

DISCLOSURE OF THE INVENTION

The proposed invention seeks in particular to allow implementing, in an aircraft engine, an overspeed protection system able to cutoff the engine in case of detection of a fire or excess temperature event, before putting the electronics dedicated to the control or the protection of the engine in danger.

To this end, the invention proposes a fuel metering unit for an aircraft engine comprising:
- a metering member configured to receive a control signal and to meter the fuel feed of the engine depending on said control; and
- a cutoff member configured to cut off the fuel feed of the engine; and characterized in that the fuel metering unit also includes an engine protection computer, said protection computer being configured to detect an overspeed state of the engine speed and to transmit a control signal to the cutoff member able to cut off the fuel feed of the engine.

Advantageously, the metering unit also comprises the following features: a power control computer of the engine which is configured to receive a fuel mass flow rate setpoint and elaborate said control signal for the metering member to control the fuel flow rate originating in the metering member, depending on the received flow rate setpoint.

The invention also proposes a fuel feed control and protection system for an aircraft engine, comprising:
- an engine control computer generating a fuel mass flow rate setpoint;
- a fuel metering unit for the aircraft engine, comprising:
  - a metering member configured to receive a control signal and to meter the fuel feed of the engine depending on said control;
  - a cutoff member configured to cut off the fuel feed of the engine;
- characterized in the fuel metering unit further comprises an engine protection computer, configured to:
  - receive data allowing evaluating the instantaneous value of the engine speed;
  - compare the instantaneous value of the engine speed to a predefined engine speed threshold value and determine a possible overspeed state on the basis of this comparison; and
  - transmit a control signal to a cutoff control member contained in the cutoff member to cut off the fuel flow of the engine if an overspeed state of the engine speed is determined.

Advantageously, the fuel feed control system also comprises the following features:
- the engine control computer is also configured to transmit a control signal to the metering member of the metering unit to control the fuel flow rate originating in the metering member, depending on the received flow rate setpoint;
- the fuel metering unit also includes a power control computer of the engine configured to receive the flow rate setpoint and elaborate said control signal for the metering member to control the fuel flow rate originating in the metering member, depending on the received flow rate setpoint;
- the engine control computer is configured to be fed with electrical power by an electrical generator of the engine, and said engine control computer is configured to feed the power control computer of the engine with electrical power;
- the protection computer is fed with electrical power by an electrical power feed network serving the on-board systems of the aircraft;
- the engine control computer is installed in a zone declared to be "fire free" of the aircraft;
- the metering unit is installed in a first fire zone of the aircraft, and the engine control computer is installed in a second fire zone of the aircraft distinct from the first; and
- the electronic metering unit and the engine control computer are installed in the same fire zone of the aircraft.

The invention also proposes an aircraft turbomachine comprising a system for controlling an engine according to one of the features described previously.

Advantageously, the invention allows rationalizing the integration of an electronic board within a conventional metering unit by adding functionalities of engine protection to it, consequently allowing facilitating the certification strategy of the system while limiting the costs and physical impacts (mass, volume) and increasing the performance of the engine (via the improvement in metering accuracy).

DESCRIPTION OF THE FIGURES

Other features, aims and advantages of the invention will be revealed by the description that follows, which is purely illustrative and not limiting, and which must be read with reference to the appended drawings, in which.

DETAILED DESCRIPTION OF THE INVENTION

What is designated by the term computer is in particular a controller/control unit for physical devices, and usually comprising a processor, memories, input-output interfaces. The computer is represented physically by one or more electronic boards implementing its functionalities.

First Embodiment

Figure 1A:
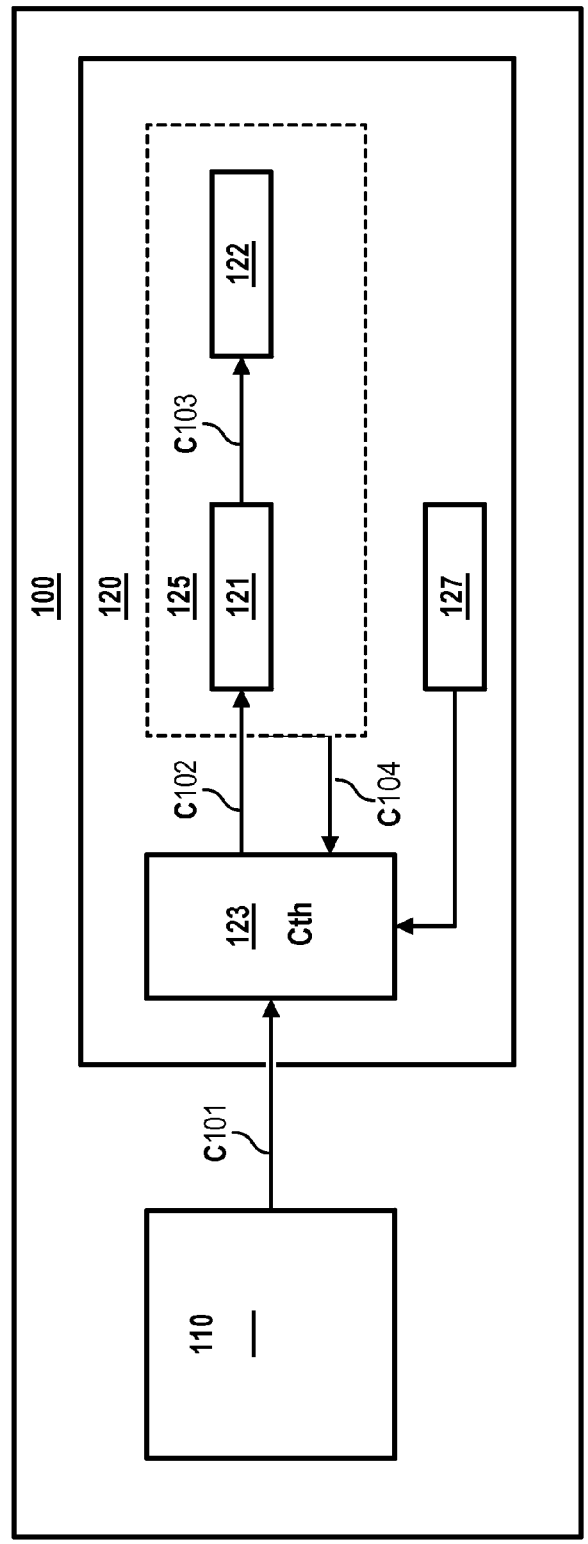
FIG. 1A illustrates a system for controlling a turbojet engine of an aircraft according to a first embodiment of the invention.

FIG. 1A illustrates a control and protection system 100 of an aircraft engine, implemented by a distributed architecture, according to a first embodiment.

Thus, the system 100 comprises an engine control computer 110 which generates a fuel mass flow rate setpoint C101 to provide the thrust demanded by the aircraft in real time. This setpoint C101 is then transmitted to an electro-hydromechanical metering unit 120 which carries out the fuel metering.

More precisely, the setpoint C101 is transmitted to a power control computer 123 of the electro-hydromechanical metering unit 120.

The control computer 123 determines, depending on the flow rate setpoint C101, a theoretical position setpoint Cth of a fuel metering member 125 (of the FMV type for example) of the electro-hydromechanical metering unit 120.

Depending on the movement setpoint Cth, the control computer 123 transmits an electrical control setpoint C102 to a servovalve 121 (of the EHSV for "Electro-Hydraulic Servo Valve" type for example) of the fuel metering member 125. The servovalve 121 generates, in correspondence with the control setpoint C102, a hydraulic power command C103 for a hydraulic actuator 122 allowing moving a blocking element (such as a slide) of the fuel metering member 125. Depending on said command, the hydraulic actuator 122 carries out the fuel metering, for example by the movement of a movable metering slide.

The metering member 125 is associated with a position sensor of the blocking element (for example the position of the metering slide, giving a fluid passage cross section) which transmits the information measured by said sensor to the control computer 123 (arrow C104). The position sensor can be of the LVDT type (for "Linear Variation Displacement Transducer").

The fuel flow rate is then controlled by the control computer 123 by means of a corrector network (traditionally of the PID: Proportional-Integral-Derivative) type allowing nullifying the difference between the theoretical position setpoint Cth and the measured position of the blocking element.

The fuel flow rate can be obtained from the following formula: $Q = K \times S \times \sqrt{\rho \times \overrightarrow{\Delta P}}$, with Q corresponding to the volume flow rate, K a constant, S a fluid passage cross section—a function of the position of the blocking element, $\rho$ the mass per unit volume of the fuel and $\Delta P$ corresponding to the differential pressure.

The control functions are therefore directly ensured by the electro-hydromechanical metering unit 120.

The control and protection system 100 can also comprise a flowmeter 127 as described in Snecma application FR3053396A1. What is referred to as a flowmeter is any measurement apparatus allowing knowing a mass flow of fluid, in this case a liquid fuel.

The flowmeter allows measuring the fuel mass flow rate leaving the electro-hydromechanical metering unit 120. This measurement is then communicated to the control computer 123 to calculate the density of the fuel and determine by a means other than the position of the metering system, a reconstructed flow rate.

In fact, it is possible to observe considerable differences between the effective flow rate and the setpoint flow rate. This flow rate thus reconstructed has improved accuracy relative to the reconstructed flow rates corresponding to a theoretical flow rate passing through the metering valve.

Advantageously, it is possible to improve the accuracy of the metering by the generation of a flow rate setpoint, using the determined reconstructed flow rate.

Figure 1B:
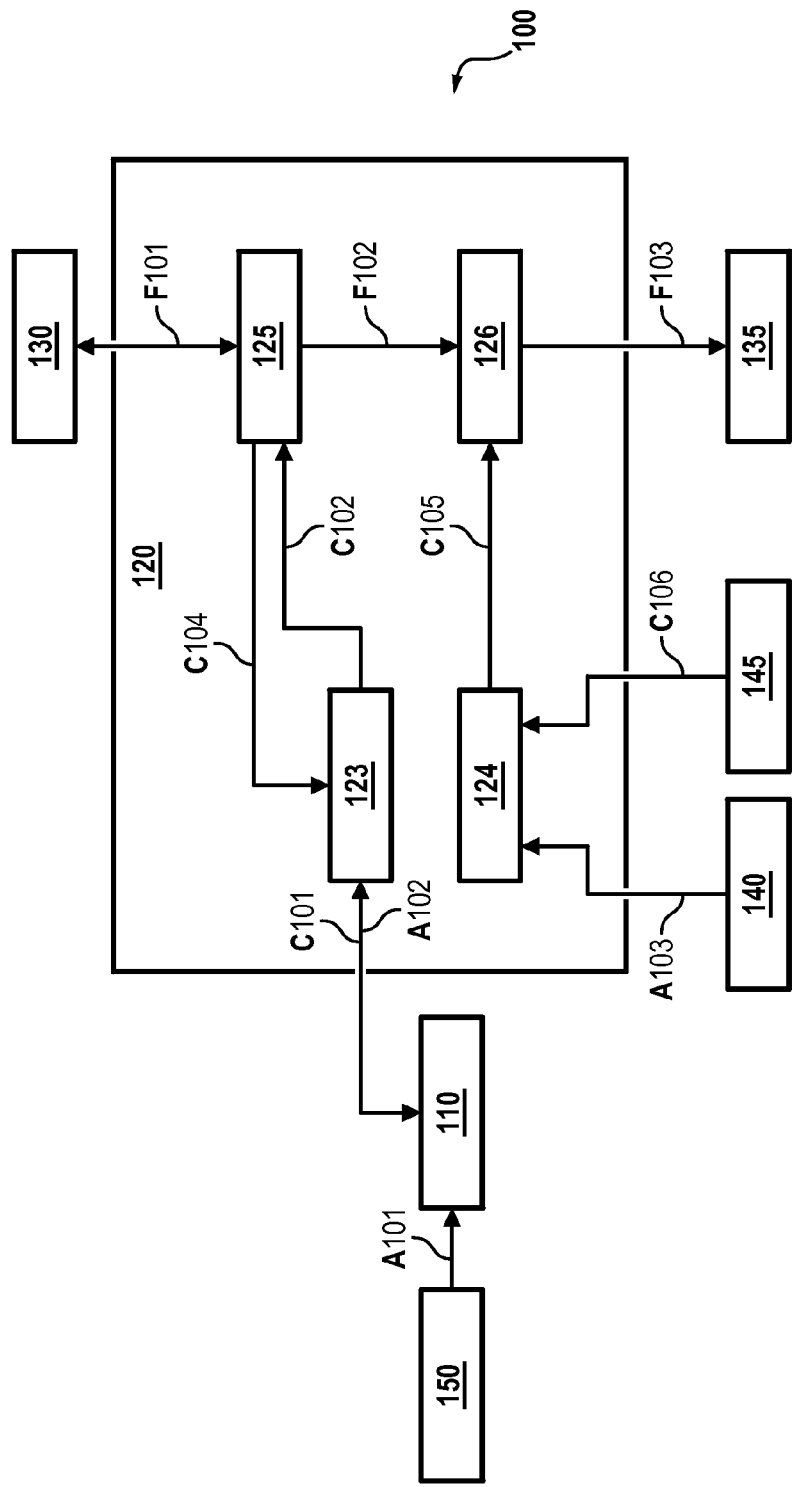
FIG. 1B illustrates in more detail a system for controlling a turbojet of an aircraft according to the first embodiment of the invention

FIG. 1B illustrates in more detail the control and protection system 100 according to the first embodiment.

The architecture as presented separates the function linked to metering from those linked to the protection and shutoff of the engine.

As seen previously, the electro-hydromechanical metering unit 120 includes the control computer 123 which interacts (arrow C102) with a metering member 125, by taking over the control of the actuators of said member, linked to the metering of the fuel originating in the upstream portion 130 of a fuel feed system (arrow F101). To this end the control computer 123 is configured for the acquisition of the measurements and of the features (of the relevant sensors and actuators) as illustrated by the arrow C104.

The system 100 also comprises a protection and cutoff computer 124. The latter interacts with a cutoff member 126, by taking over the control of the actuators of said member (arrow C105), linked to fuel cutoff, for example a control servovalve of a pressurization valve HPSOV ("High Pressure Shut-Off Valve") of the fuel and cutoff system.

The metered fuel originating in the metering member 125 can transit thereafter through the cutoff member 126 (arrow F102) before joining the downstream portion 135 of the fuel feed system (arrow F103).

The protection and cutoff computer 124 also integrates functions linked to overspeed management, in particular:
the acquisition of the speeds of the high-pressure and low-pressure spools of the engine (double spool turbojet) by one or more sensors 145 (arrow C106);
comparison of the engine speeds acquired with predefined engine speed thresholds;
detection of an "overspeed" state of the high-pressure or low-pressure spool if the engine speeds are greater than the threshold values; and
transmission of a control signal to a cutoff control member contained in the fuel cutoff member 126 to depart from the overspeed state as illustrated by arrow C105; said control signal causing the actuation linked to the accommodation (generally the cutoff of the fuel flow).

Other protective functions can be integrated into the electronic metering unit 120: fire protection, protection against excess thrust, protection against loss of control of the thrust, etc.

The electronic metering unit 120 dialogues primarily with the engine control computer 110, said unit 120 can also be in interface with the aircraft (which can transmit an engine cutoff command) and/or a maintenance management member (which can be at the aircraft or the engine).

Advantageously, the engine control computer 110 is fed by a generator 150 (arrow A101), for example of the permanent magnet generator type (PMA, PMG . . . ), of the engine. The computer 110 itself feeds the control computer 123 (arrow A102).

The protection and cutoff computer 124 is for its part fed (arrow A103) by the same feed network 140 as that serving the different on-board systems (electrical generator, auxiliary power unit).

Thus, a problem involving feeding by the engine does not cause a simultaneous feed failure in the protection and cutoff functions.

The control computer 123 and the protection and cutoff computer 124 can be positioned on two different electronic boards. They can also be positioned on the same electronic board.

However, in the latter case, there exists a mechanical divider between these two computers. Thus, the latter are mutually segregated (functionally and physically) to satisfy the requirements of the CS-E certification basis. This allows guaranteeing that the two computers cannot corrupt each other mutually and risk creating a dangerous event such as an uncontrolled overspeed.

In this first embodiment, the protection and cutoff computer 124 is contained in the fuel metering unit 120, and is therefore localized in a "fire zone," because by definition is surrounded by fuel. Only the compartments which contain sources of ignition and the risk of leakage of flammable liquids are classified as fire zones, i.e. including potential ignition sources in the event of failure which could cause a temperature higher than the self-ignition temperature of the fluids possibly present in the compartment. By opposition, a non-fire zone is a zone which is not in the configuration defining a fire zone.

Consequently, the control and protection system 100 comprises functions/means allowing the detection of the fire event, for example temperature sensors located outside or inside a housing of the electronic metering unit 120.

Second Embodiment

FIG. 1B illustrates a sub-system 200 for controlling the control and protection system 100 according to a second embodiment.

In the electronic fuel metering unit 120 are located the hydraulic servovalve 121 and the actuator 122 (FMV), as well as its position sensor.

However, unlike the first embodiment, certain of the functions linked to fuel metering are implemented in the engine control computer 110: the generation of the flow rate setpoint, the corrector network, the generation of the position command, as well as the acquisition of at least position sensor which provides information regarding the position of the movable slide of the FMV.

As in the first embodiment, the control and protection system 100 can also comprise a flowmeter as described in the first embodiment.

The flowmeter allows measuring the mass flow of fuel originating in the electro-hydromechanical metering unit 120. Unlike the first embodiment, this measurement is then communicated to the engine control computer 110 to calculate the density of the fuel and determine a reconstructed flow rate.

Figure 2A:
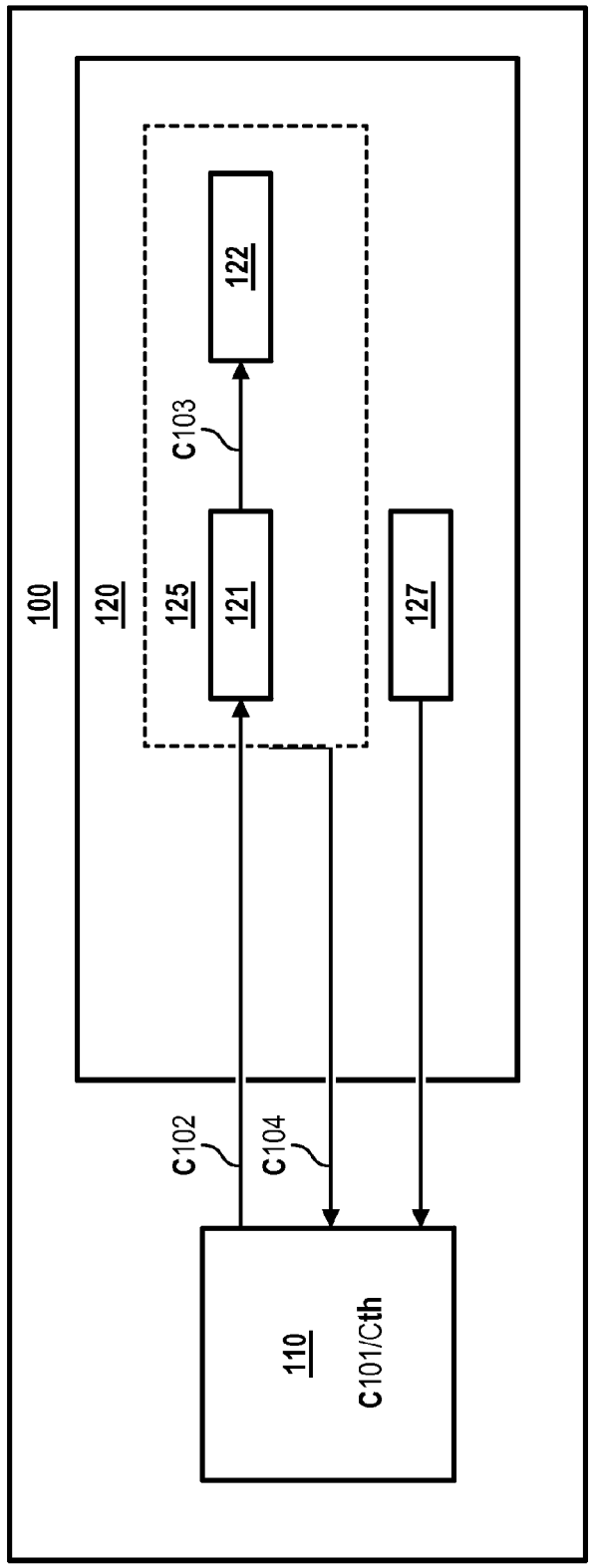
FIG. 2A illustrates a system for controlling a turbojet engine of an aircraft according to a second embodiment of the invention.
Figure 2B:
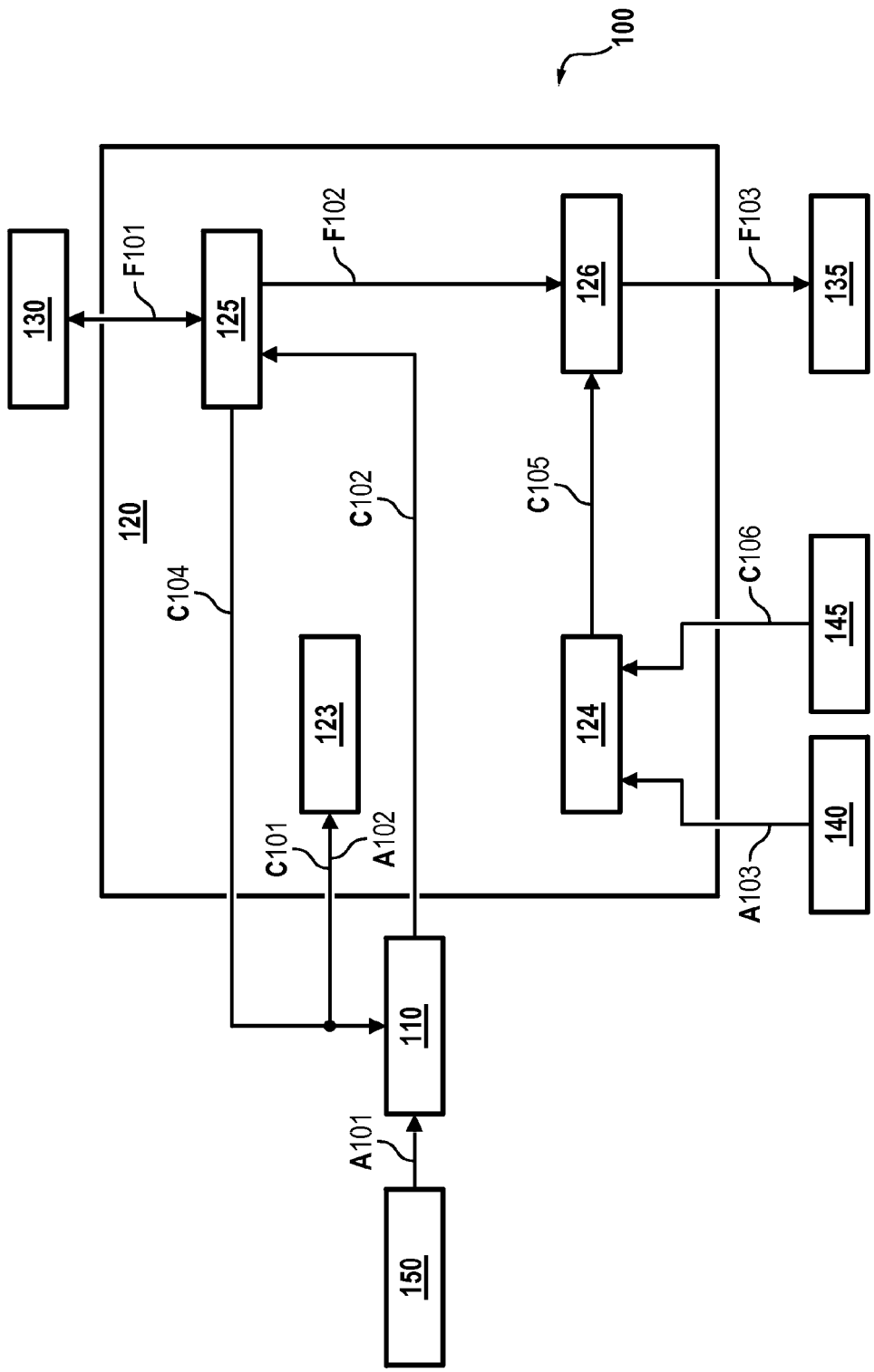
FIG. 2B illustrates in more detail a system for controlling a turbojet of an aircraft according to the second embodiment of the invention.

FIG. 2B illustrates in more detail the control and protection system 100 according to the second embodiment.

As in the first embodiment, the electronic metering unit 120 integrates the functions linked to overspeed management; they are preferably integrally located in the protection and cutoff computer 124, in particular:

- the acquisition of the speeds by the protection and cutoff computer 124;
- the comparison of the engine speeds acquired with the predefined threshold engine speeds by the protection and cutoff computer 124;
- the detection of an "overspeed" state of the high-pressure or low-pressure spool if the engine speeds are greater than the threshold values, by the protection and cutoff computer 124; and
- the transmission of a control signal to a cutoff control member contained in the cutoff member 126 by the protection and cutoff computer 124, said control causing the actuation linked to the accommodation (generally the cutoff of fuel flow) by the protection and cutoff computer 124.

Other protective functions can be integrated into the electronic metering unit 120: fire protection, protection against excess thrust, protection against loss of control over thrust, etc.

Thus, the architecture of the electronic metering unit 120 in this second embodiment is identical with the breakdown of the functions in the computers 123 and 124, with the exception that the control computer 123 integrates fewer functions than the control computer 123 implemented in the first embodiment.

In this second embodiment, several contests of installation of the control computers 110 and the electronic metering unit 120 are possible:

The engine control computer 110 is installed in a zone declared to be "fire free." In this context, the management of the fire event (or other "local events" defined in the certification standard) is easy due to the physical segregation of the functions of protection and of control. In the event of fire in the zone of the fuel metering unit 120, the protection and shutoff computer 124 risks "dying" but it will never be able to trigger an overspeed event (it acts only on the shutoff member). At worst, the engine will not, in the time period considered, be protected against an overspeed event. At the conclusion of the regulatory 5 minutes, the engine can be cut off by the pilots of the aircraft via the fuel shutoff valve of the aircraft, or by the engine HPSOV if a direct link with the aircraft exists.

The electronic metering unit 120 is installed in a different fire zone than that of the engine control computer 110. The management of the fire event (of other "local events defined in the CS-E) is easy due to the physical segregations of the protection and control functions:

In case of fire in the zone of the electronic metering unit 120, the protection and cutoff computer 124 risks "dying," but it will never be able to trigger an overspeed event (it acts only on the cutoff member). At the conclusion of the regulatory 5 minutes, the engine can have been cut off by the pilots via the fuel cutoff valve of the aircraft, or by the engine HPSOV if a direction link with the aircraft exists.

In case of fire in the zone of the engine control computer 110, it is possible that said computer suffers a "non-clean (erratic) death" which could generate an engine overspeed, for example by commanding the FMV into full opening. Nevertheless, the segregation of the zones allows by definition guaranteeing that the fire also will not reach the electronic metering unit 120. The protection functions will therefore not be affected and the protection and cutoff computer 124 of the metering unit 120 will cut off the engine in the event of an overspeed.

The electronic metering unit 120 is installed in the same (fire) zone as the engine control computer 110. As for the first embodiment, the control (fuel metering) and protection functions, being located in the same fire zone, the control and protection system 100 comprises functions/means allowing the detection of the fire event, for example temperature sensors located outside or inside the housing of the metering unit 120.

The electronic metering unit 120 described therefore allow rationalizing the integration of an electronic board on a conventional metering unit by adding engine protection functionalities to it. This selection allows limiting excess costs linked to the integration of an electronic board on a metering unit, because these protection functions must be integrated no matter what happens (either in the main engine control computer, or in a specific computer) and cause high non-recurrent costs.

Moreover, the integration of the protection into an electronic metering unit allows limiting the physical impacts (mass, volume) on the overall architecture of the engine (by comparison with a separate protection computer having its specific housing). In fact, the reduction/limitation of the interfaces induced by the grouping constitutes a great gain.

In addition, the proposed architectures allow facilitating the certification strategy of the system (in particular with regard to local events, such as fire), in comparison with protection integrated into the main engine control computer.

Consequently, the invention described allow facilitating the certification strategy of the system while limiting the costs and physical impacts (mass, volume) and by improving the performance of the engine (via improving the metering accuracy).

The invention claimed is:

1. A fuel feed control and protection system for an aircraft engine of an aircraft, comprising
   an engine control computer generating a fuel mass flow rate setpoint, and
   a fuel metering unit for the aircraft engine, comprising
   a metering member configured to receive a control signal and to meter a fuel feed of the aircraft engine depending on said control signal;
   a cutoff member configured to cut off the fuel feed of the aircraft engine;
   wherein the aircraft is divided into fire zones, comprising compartments of the aircraft which contain sources of ignition and/or the risk of leakage of flammable liquids, and a fire-free zone, comprising parts of the aircraft not in the fire zones;
   the fuel metering unit is installed in a first fire zone of the aircraft, and the engine control computer is installed in a second fire zone of the aircraft distinct from the first fire zone;
   the fuel metering unit further comprises a protection and cutoff computer of the aircraft engine, configured to:
   receive data allowing evaluating an instantaneous value of an engine speed;
   compare the instantaneous value of the engine speed to a predefined aircraft engine speed threshold value and determine a possible overspeed state on the basis of this comparison; and
   transmit a control signal to a cutoff control member contained in the cutoff member to cut off the fuel feed of the aircraft engine if an overspeed state of the engine speed is determined.

2. The fuel feed control and protection system according to claim 1, wherein the engine control computer is also configured to transmit a position signal to the metering member of the fuel metering unit to control a fuel flow rate originating in the metering member, depending on the fuel mass flow rate setpoint.

3. The fuel feed control and protection system according to claim 1, wherein the fuel metering unit also includes a power control computer of the aircraft engine configured to receive a flow rate setpoint and elaborate said control signal for the metering member to control a fuel flow rate originating in the metering member, depending on the flow rate setpoint.

4. The fuel feed control and protection system according to claim 3, wherein the aircraft engine control computer is configured to be fed with electrical power by an electrical generator of the aircraft engine, and said engine control computer is configured to feed electrical power to the power control computer of the aircraft engine.

5. The fuel teed control and protection system according to claim 1, wherein the protection and cutoff computer is fed with electrical power by an electric power feed network serving on-board systems of the aircraft engine.

6. The fuel feed control and protection system according to claim 1, wherein the fuel metering unit and the engine control computer are installed in the same fire zone of the aircraft engine.

7. An aircraft turbomachine comprising a fuel feed control and protection system according to claim 1.

* * * * *